US012794219B2

(12) United States Patent
Girardin et al.

(10) Patent No.: US 12,794,219 B2
(45) Date of Patent: Nov. 10, 2026

(54) SHORT CIRCUIT PROTECTION OF POWER SWITCHES

(71) Applicant: POWER INTEGRATIONS, INC., San Jose, CA (US)

(72) Inventors: David Bernard Michel Girardin, Bassecourt (CH); Olivier Garcia, Brügg (CH)

(73) Assignee: Power Integrations, Inc., San Jose, CA (US)

( * ) Notice: Subject to any disclaimer, the term of this patent is extended or adjusted under 35 U.S.C. 154(b) by 108 days.

(21) Appl. No.: 18/881,204

(22) PCT Filed: Jul. 7, 2022

(86) PCT No.: PCT/IB2022/056295
§ 371 (c)(1),
(2) Date: Jan. 3, 2025

(87) PCT Pub. No.: WO2024/009133
PCT Pub. Date: Jan. 11, 2024

(65) Prior Publication Data

US 2025/0392116 A1 Dec. 25, 2025

(51) Int. Cl.
*H02H 7/122* (2006.01)

(52) U.S. Cl.
CPC .................................. *H02H 7/1222* (2013.01)

(58) Field of Classification Search
CPC ........... H02H 7/1222; H03K 17/08128; H03K 17/0828; H03K 17/165; H03K 17/168; H03K 2217/0027
USPC .......................................................... 361/91.1
See application file for complete search history.

(56) References Cited

U.S. PATENT DOCUMENTS

| | | | | |
|---|---|---|---|---|
| 7,768,337 | B2 | 8/2010 | Bayerer | |
| 2007/0070567 | A1* | 3/2007 | Bayerer ............. | H03K 17/0422 361/100 |
| 2017/0365995 | A1* | 12/2017 | Bahl .................... | H02H 1/0007 |
| 2019/0379277 | A1* | 12/2019 | Jain ......................... | H02M 1/32 |

FOREIGN PATENT DOCUMENTS

| | | |
|---|---|---|
| JP | H11-262242 A | 9/1999 |
| JP | 2006-074937 A | 3/2006 |

(Continued)

OTHER PUBLICATIONS

Bohlländer et al., "Desaturated Switching of Trench—Fieldstop IGBTs," Paper, In PCIM Europe 2006, International Exhibition and Conference for Power Electronics, Intelligent Motion, Renewable Energy and Energy Management, May 2006, 7 pages.

(Continued)

*Primary Examiner* — Kevin J Comber
(74) *Attorney, Agent, or Firm* — Fish & Richardson P.C.

(57) ABSTRACT

A control system for a power switch having a channel. The system includes short circuit protection circuitry that is configured to, in response to detection of an overvoltage across the power switch by the overvoltage detection circuitry while the control terminal of the power switch is at a second potential level, change a control terminal of the power switch from one potential level to another potential level such that the charge carrier concentration in the channel is increased.

23 Claims, 4 Drawing Sheets

(56) References Cited

FOREIGN PATENT DOCUMENTS

| | | |
|---|---|---|
| JP | 2019-518415 A | 6/2019 |
| JP | 2021-151038 A | 9/2021 |

OTHER PUBLICATIONS

Fuhrmann et al., "Enhancing short-circuit capability of high-performance IGBTs by gate-drive unit," Paper, PCIM Europe 2019; International Exhibition and Conference for Power Electronics, Intelligent Motion, Renewable Energy and Energy Management, May 7-9, 2019, 7 pages.
International Preliminary Report on Patentability in International Appln. No. PCT/IB2022/056295, mailed on Jan. 16, 2025, 8 pages.
International Search Report and Written Opinion in International Appln. No. PCT/IB2022/056295, mailed on Feb. 6, 2023, 14 pages.
Office Action in Japanese Appln. No. 2025-500009, mailed on Apr. 22, 2026, 15 pages (with Machine Translation).

* cited by examiner

SHORT CIRCUIT PROTECTION OF POWER SWITCHES

BACKGROUND

This disclosure relates generally to semiconductor switches that switch power, e.g., in applications including switched mode power converters and inverters.

Electronic devices use electrical power to operate. There are many application contexts in which providing power to electronic devices requires that relatively high voltages and/or currents be switched. If power switches are not properly designed to withstand high voltages or carry high currents, the power switches can be damaged. Further, even a properly designed power switch can be damaged under improper operating conditions, including short circuits, electrostatic discharge events, power surges, lightning strikes, and others. Depending on the context, failure of the power switch can lead not only to failure of the device that includes the power switch, but also to failure of other equipment.

The safe operating area (SOA) of a power switch is a definition of the current and voltage conditions over which a power switch can be expected to operate without self-damage or degradation. In practice, manufacturers and suppliers will present the safe operating area for different power switches in a datasheet—for both forward-bias (i.e., while the power switch is on) and reverse-bias (i.e., while the power switch is off or turning-off) conditions.

In addition to safely, it is also desirable that power be switched efficiently. The two primary sources of power loss in semiconductor switches are conduction losses and switching losses. Conduction losses occur when the power switch is conducting and are due to the inherent forward voltage drop of the channel of the power switch. Conduction losses can be reduced, e.g., by reducing the duty cycle (i.e., the relative duration during which the power switch is conducting) and/or by reducing the forward voltage drop of the power switch channel. In general, the duty cycle is determined by the operational context and it is often not practical to reduce the duty cycle for the sake of reducing conduction losses. The forward voltage drop can be reduced, e.g., by increasing the effective size of the channel (i.e., the dimensions of a single channel or by conducting current through multiple channels in parallel) or by increasing the number of charge carriers in a channel. For example the number of charge carriers can be increased by careful design of the power switch and/or by biasing the control terminal of the switch to increase the number of mobile charge carriers in the channel in the ON-state.

By way of example, many modern enhancement-mode IGBT power switches can be biased in the ON-state with a gate-to-emitter voltage of approximately +15 Volts. In many applications, this suffices to draw sufficient carriers into the channel such that the conduction losses are tolerable. However, in other applications (e.g., in applications with relatively low switching frequencies), the conduction losses are an unsatisfactorily large portion of the total losses. In these other applications, the gate-to-emitter voltage can be increased, e.g., to approximately +25 Volts so that more charge carriers are drawn into the channel.

Switching losses occur when the power switch is switching from an OFF-state to an ON-state and vice-versa. During switching, both the voltage across the power switch and the current through the power switch transition between their respective steady-state values in the OFF- and ON-states. The product of this voltage and current during the transition is the power lost due to the switching. Switching losses can be reduced, e.g., by reducing the switching frequency (i.e., how often the switch transition is made) and/or by switching between the ON- and OFF-states more quickly. In many instances, the switching frequency is determined by the operational context and it may not be practical to reduce the switching frequency for the sake of reducing switching losses. The duration of switching can be reduced by moving charge carriers into and out of the channel of the switch more quickly, e.g., by careful design of the power switch and/or by biasing the control terminal of the switch to increase the attractive/repulsive forces that move charge carriers into/out of the channel.

The desires that switching be both safe and efficient are often counter to one another and design trade-offs must often be made. For example, increasing the number of charge carriers in the channel make it more likely that the current and voltage conditions in the power switch move outside the safe operating area in the event of a short circuit condition. There is inevitably a delay in detecting a short circuit and turning off the power switch after detection. During this delay, the current through a power switch can increase to such a high level that the voltage across the power switch increases and the transistor saturates (e.g., in the case of a MOSFET) or desaturates (e.g., in the case of an IGBT). In (de)saturation, the current conducted by the power switch may become so high that the power switch is damaged or fails. To prevent this, driver circuitry for the gate or other control terminal of a power switch often includes (de) saturation protection functionality. For example, the voltage across the power switch can be measured to detect (de) saturation.

To reduce the delay responding to a short circuit condition, control and drive circuitry with (de) saturation protection is generally directly coupled to the power switch. In some cases—especially applications where the power switch is an IGBT—such driver circuitry can be implemented in an application-specific integrated circuit (ASIC) that is designed to drive power switches having certain characteristics.

DESCRIPTION OF DRAWINGS

Like reference symbols in the various drawings indicate like elements.

DETAILED DESCRIPTION

For didactic purposes, the detailed description is cast in terms of insulated gate bipolar transistor (IGBT) power switches. However, corresponding teachings can be applied to a variety different enhancement or depletion mode devices (e.g., bipolar junction transistors (BJTs), metal-oxide-semiconductor field-effect transistors (MOSFETs), high-electron-mobility transistors (HEMTs)) with electron or hole charge carriers. The devices can be implemented in silicon, silicon carbide, gallium nitride, or other semiconductor materials.

Figure 1:
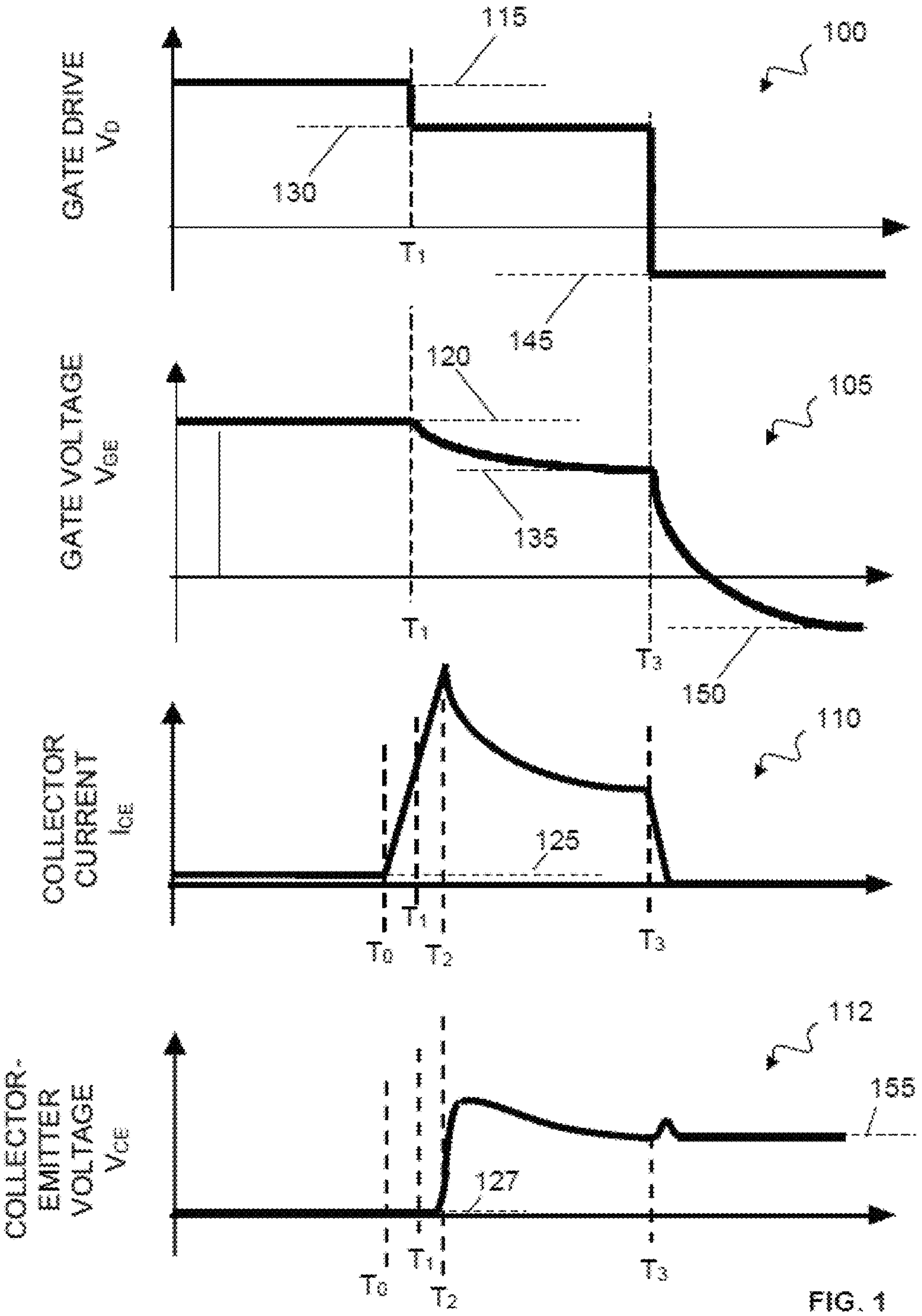
FIG. 1 is a schematic representation of various waveforms during a response to detection of a short circuit during driving of an IGBT power switch.

FIG. 1 is a schematic representation of various waveforms 100, 105, 110, 112 during a response to detection of a short circuit during driving of an IGBT power switch. The illustrated waveforms can arise, e.g., when the IGBT power switch is biased with a gate-to-emitter voltage that is designed to draw a relatively high number of charge carriers into the IGBT channel, e.g., a gate-to-emitter voltage of approximately +25 Volts in modern IGBT devices.

In particular, waveform 100 represents a reference voltage $V_D$ as a function of time, waveform 105 represents the actual (internal) gate-to-emitter voltage $V_{GE}$ of the gate as a function of time, waveform 110 represents the collector current $I_C$ as a function of time, and waveform 112 represents the collector-to-emitter voltage $V_{CE}$ as a function of time. The reference voltage $V_D$ waveform 100 represents an idealized voltage at the gate of an IGBT power switch, whereas gate-to-emitter voltage $V_{GE}$ represents the actual voltage at the gate of an IGBT power switch. In real-world devices, gate-to-emitter voltage $V_{GE}$ will differ from reference voltage $V_D$. The precise nature of the differences will depend on the nature of the circuitry implementation. Collector current $I_C$ in waveform 110 and collector-to-emitter voltage $V_{CE}$ in waveform 112 are responses of the driven system to the gate-to-emitter voltage $V_{GE}$ in waveform 105.

The time scales of waveforms 100, 105, 110, 112 are identical and, for typical IGBT power switches, the spanned times are generally between 2 to 10 microseconds. The voltage scales of waveforms 100, 105 are nearly identical and, for typical IGBT power switches, the spanned voltages are generally between −15 to 25 volts. For typical IGBT power switches, the current scale of waveforms 110 is generally between 2 to 30 kiloamperes. For typical IGBT power switches, the voltage scale of waveform 112 is generally between 600 to 6500 volts.

At the beginning of the illustrated time spans, the IGBT is in conduction. The reference voltage $V_D$ represented by waveform 100 and gate-to-emitter voltage $V_{GE}$ represented by waveform 105 are both essentially at their respective highest level 115, 120. For the illustrated time spans, gate and other capacitances (including the gate-emitter capacitance, gate-collector capacitance, and parasitics) are essentially fully charged and the reference voltage and the actual gate voltage essentially do not change. Also, the collector current $I_C$ represented by waveform 110 is at a level 125 and collector-to-emitter voltage $V_{CE}$ is at a level 127. In general, the magnitude of the current at level 125 is primarily determined by the system regulation. The magnitude of the voltage at level 127 is primarily determined by the device characteristics of the IGBT, as well as the applied gate voltage and other parameters (e.g., temperature). In other words, the forward voltage drop of the IGBT is generally negligible in comparison to the voltage across the load. For the illustrated time spans, the power demand of the load is constant and the collector current is steady over time.

Levels 115, 120 are selected to make the voltage drop across the IGBT channel in the ON-state relatively small. In any case, even though the IGBT would be in the ON-state and the voltage drop across the IGBT would remain negligible in comparison to the voltage drop across the load if the reference voltage $V_D$ and actual gate-to-emitter voltage $V_{GE}$ were at a lower level than levels 115, 120, the IGBT control and drive circuitry drives the IGBT using a gate voltage that further reduces the forward voltage drop of the channel and reduces conduction losses.

At time $T_0$, a short circuit condition occurs outside the power switch. The collector current $I_C$ represented by waveform 110 starts to increase rapidly. After a delay, overcurrent protection functionality in the IGBT control and drive circuitry is triggered at time $T_1$ in response to detection of the short circuit condition. In FIG. 1, the magnitude of the delay is the difference in time between $T_0$ and $T_1$. The short circuit condition can be detected in a variety of different ways. For example, the voltage across the IGBT and/or the rate of change in the collector current can be compared with a respective threshold to detect the short circuit condition.

Regardless of how the short circuit condition is detected, the collector current $I_C$ continues to increase during this delay. In some instances, the increase may be large enough that collector current $I_C$ rises to levels at which turn-off of the IGBT power switch would not be permitted. In other words, direct turn-off of the IGBT power switch with such a large collector current $I_C$ would damage the IGBT.

Thus, rather than directly turning off the IGBT power switch, the IGBT control and drive circuitry starts a two stage process for turning off the IGBT. In the first stage, the IGBT control and drive circuitry does not attempt to have the IGBT driven with a voltage that would switch the IGBT into an OFF-state. Rather, the IGBT control and drive circuitry initially drives the IGBT with a gate-to-emitter voltage $V_{GE}$ level 135 that suffices to reduce the number—and hence concentration—of charge carriers in the channel. In general, the charge carrier concertation will suffice to maintain the IGBT in the ON-state. In other words, the IGBT control and drive circuitry would have the IGBT drive with a reference voltage $V_D$ level 130. By reducing the number of charge carriers in the channel, even a desaturated IGBT will have a lower collector current $I_C$ level and the IGBT will not be damaged. Indeed, many gate driver controllers for IGBT power switches already include desaturation protection functionality that suffices to protect the IGBT power switch when the gate-to-emitter voltage $V_{GE}$ is low. With a low gate-to-emitter voltage $V_{GE}$, the IGBT power switch can be switched into the OFF state in a safe manner.

In the illustrated context, voltage level 130 is lower than voltage level 115. For common IGBT devices, voltage level 130 can be, e.g., between 12 and 17 Volts, whereas voltage level 115 can be, e.g., between 20 and 30 Volts. However, in some instances, voltage level 130 can be, e.g., between 5 and 12 volts, resulting in a reduced charge carrier concentration without the power switch remaining in a fully ON-state. In the illustrated implementation, the transition of the idealized reference voltage $V_D$ between levels 115, 130 in waveform 100 is shown as an idealized step. In the real world actual gate-to-emitter voltage $V_{GE}$, non-idealities will be present. In particular, due to gate and other capacitances, the actual gate-to-emitter voltage $V_{GE}$ represented in waveform 105 decreases more slowly than the reference voltage $V_D$ in waveform 100.

For some time after the IGBT control and drive circuitry would initiate driving of the IGBT power switch with a reference voltage $V_D$ level 130, the collector current $I_C$ continues to increase and the IGBT power switch will eventually desaturate. In the illustrated implementation, desaturation of the IGBT power switch occurs at $T_2$ and the collector-to-emitter voltage $V_{CE}$ increases rapidly as shown waveform 112. Also in the illustrated implementation, the collector current $I_C$ reaches a maximum value at time close to $T_2$.

As discussed above, the increasing collector current $I_C$ rises to a level that threatens to harm the IGBT should the IGBT control and drive circuitry continue to drive the IGBT directly into the OFF state. Rather than do this, the IGBT control and drive circuitry drives the IGBT power switch with a voltage level that suffices to reduce the number of charge carriers in the channel and may maintain the IGBT in the ON-state. Over time (here, the time between $T_2$ and $T_3$), the collector current will fall to a level from which the IGBT power switch be driven off. At time $T_3$ the IGBT is desaturated but can be safely driven into the OFF-state.

As an aside, the time at which gate-to-emitter voltage $V_{GE}$ approximately reaches level 135 is not necessarily the same time as when the IGBT power switch can be safely driven into the OFF-state. In other words, in other implementations, gate-to-emitter voltage $V_{GE}$ will approach level 135 before or after time $T_3$.

As for the collector current $I_C$, it will initially continue to increase rapidly even after the IGBT control and drive circuitry indicates that the IGBT is to be driven with an reference voltage $V_D$ level 130 at $T_1$. The collector-to-emitter voltage $V_{CE}$ will increase as the IGBT desaturates. However, at some point, the collector current $I_C$ will peak and—as the gate-to-emitter voltage $V_{GE}$ and number of charge carriers in the channel decrease—the collector current $I_C$ will also begin to decrease. The collector-to-emitter voltage $V_{CE}$ will generally peak shortly after the collector current $I_C$ and then start to fall. At $T_3$, the collector-to-emitter voltage $V_{CE}$ will reach a level from which the IGBT can be safely driven into the OFF-state. In response, at $T_3$, the IGBT control and drive circuitry drives the IGBT with a reference voltage $V_D$ level 145 that is low enough to switch the IGBT in the OFF-state. In the illustrated waveform 100, level 145 is negative. For example, level 145 can be between −3 and −20 volts.

The collector current $I_C$ drops relatively rapidly during this transition and will fall to approximately zero as the IGBT reaches the OFF-state. The collector-to-emitter voltage $V_{CE}$ rises during this transition and—as shown—may overshoot a level 155 of the voltage that was switched. Nevertheless, this overshoot remains within the safe operating area of the IGBT power switch. Ultimately, the collector-to-emitter voltage $V_{CE}$ will stabilize at the level 155 of the voltage that was switched.

Figure 2:
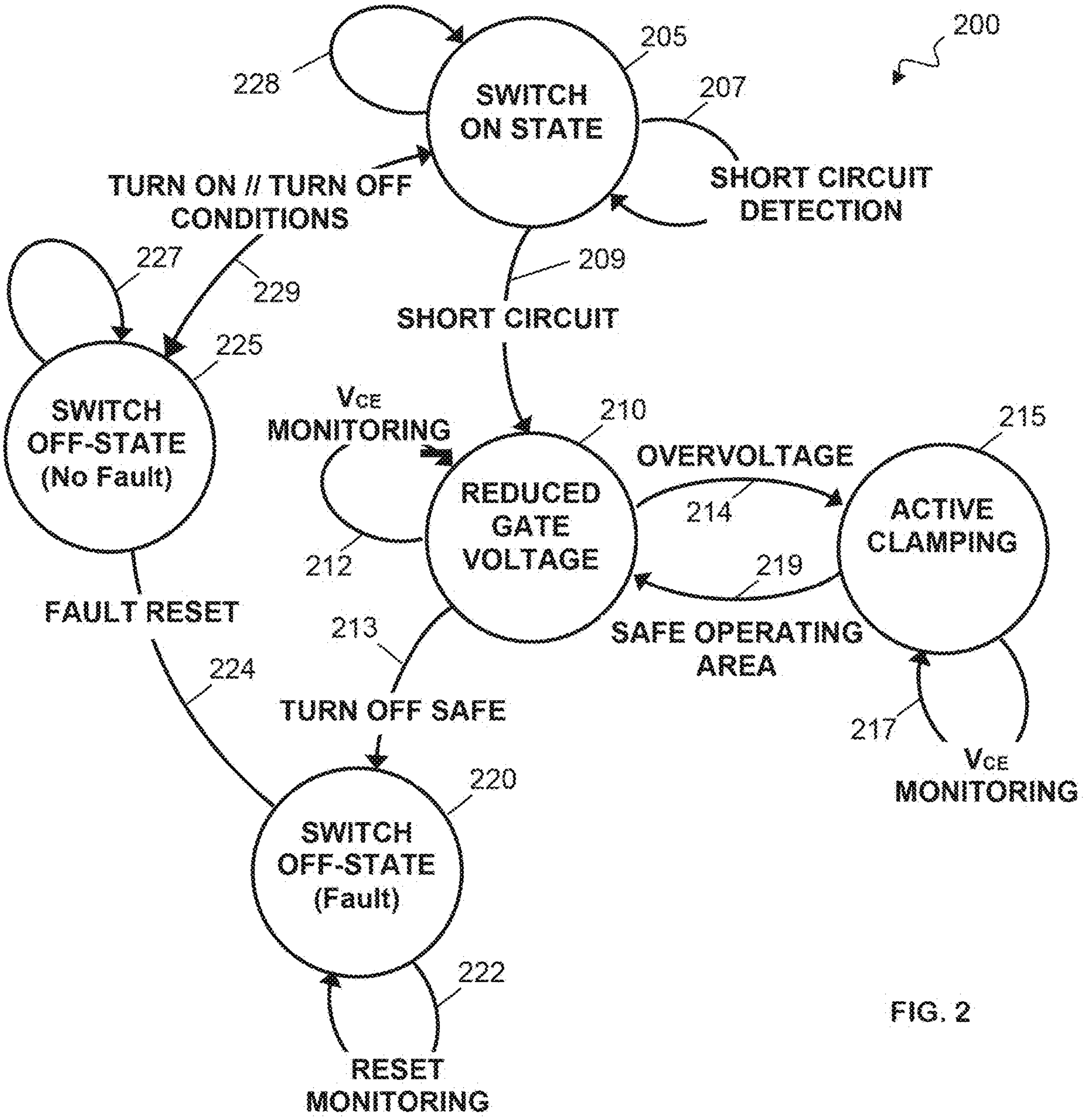
FIG. 2 is a state diagram of control and drive circuitry for a power switch during operation of the power switch and detection of a short circuit fault

FIG. 2 is a state diagram 200 of control and drive circuitry for a power switch. For didactic purposes, state diagram 200 omits many aspects of the operation of the control and drive circuitry. For example, active clamping functionality will generally continue to operate while the switch is transitioning to the OFF state (e.g., during transitions 229, 213 in state diagram 200). As another example, multi-step driving may be used to transition the switch into the ON-state (e.g., during transition 229 in state diagram 200). As yet another example, device start-up is omitted from state diagram 200 altogether. As yet another example, the illustrated states may not be exclusive or may encompass more than one state. For example, there may be multiple reduced gate voltage states in which the control and drive circuitry drives the IGBT power switch with different reduced reference gate voltages. As another example, there may be multiple active clamping states in which the gate-to-emitter voltage $V_{GE}$ differs. Further there may be additional transitions between such “enhanced” and “reduced” clamped states. State diagram 200 is thus to be interpreted as illustrative of only a portion of the operation of the control and drive circuitry.

State diagram 200 includes a switch ON-state 205, a reduced gate voltage state 210, an active clamping state 215, a switch OFF-state/fault condition 220, and a switch OFF-state/no-fault condition 225.

During normal operation, the power switch will transition between the switch ON-state 205 and switch OFF-state/no-fault condition 225 along transition 229 depending on the operational context of the power switch. Switch OFF-state/no-fault state 225 originates one or more reflexive transitions 227 indicates ongoing monitoring for one or more conditions indicating that the IGBT power switch is to be transitioned into switch ON-state 205. Switch ON-state 205 originates one or more reflexive transitions 228 indicates ongoing monitoring for one or more conditions indicating that the IGBT power switch is to be transitioned into switch OFF-state/no-fault state 225. The conditions are diverse and can include, e.g., a feedback signal reaching a level, a request signal from other circuitry, a start-up command, or a restart command. For the sake of convenience, only a single reflexive transition 227, 228 is illustrated for each state 205, 225 notwithstanding these multiple possibilities.

Turning to short circuit detection and protection, switch ON-state 205 originates a reflexive transition 207 and a state transition 209. Reflexive transition 207 indicates ongoing monitoring to detect a short circuit condition outside the IGBT power switch. As discussed above, such a short circuit can be detected, e.g., based on a relatively high rate of change in the collector current across the IGBT power switch. The short circuit detection monitoring can include comparing the parameter(s) to threshold level(s) indicative of a short circuit. State transition 209 is triggered by the detection of a short circuit and transitions the control and drive circuitry to reduced gate voltage state 210. In reduced gate voltage state 210, the control and drive circuitry drives the IGBT power switch with a reduced reference gate voltage. In the context of the waveforms shown in FIG. 1, state transition 209 corresponds to the transition in reference voltage $V_D$ that occurs at $T_1$.

Reduced gate voltage state 210 originates a reflexive transition 212 and two state transitions 213, 214. Reflexive transition 212 indicates ongoing monitoring of the voltage $V_{CE}$ across the IGBT power switch. The monitoring can include comparing the voltage $V_{CE}$ to a threshold level indicative of a harmful overvoltage across the IGBT power switch and to a threshold of the voltage $V_{CE}$ indicating that the IGBT power switch can be switched off without exiting the safe operating area. As discussed further below, $V_{CE}$ monitoring can be implemented using active or passive components. For example, responses of control and drive circuitry to the $V_{CE}$ crossing a threshold can be triggered, e.g., by a comparator or by passive components like diodes. State transition 213 is triggered by voltage $V_{CE}$ across the IGBT power switch indicating that the IGBT power switch is desaturated and transitions the control and drive circuitry to a state 220 in which the IGBT power switch is driven OFF. In the context of the waveforms shown in FIG. 1, state transition 213 corresponds to the transition in reference voltage $V_D$ that occurs at $T_3$. In other implementations, the collector current $I_C$ can be monitored to detect when the IGBT power switch is to be transitioned into the OFF state.

State transition 214 is triggered by voltage $V_{CE}$ across the IGBT power switch rising to a threshold level indicative of a harmful overvoltage across the IGBT power switch. State transition 214 transitions the control and drive circuitry to an active clamping state 215. In general, active clamping is configured to slow the transition of the IGBT power switch into the OFF state by slowing the depletion of charge carriers from the channel during the transition. Active clamping can be implemented in a number of different ways, but the different approaches generally slow the discharge of the gate of the IGBT power switch. Such a transition is illustrated below in FIG. 3.

Active clamping state 215 originates a reflexive transition 217 and a state transition 219. Reflexive transition 217 indicates ongoing monitoring of the voltage $V_{CE}$ across the IGBT power switch. The monitoring can include comparing the voltage $V_{CE}$ to a threshold level indicative of the voltage $V_{CE}$ having fallen to a level within the safe operating area of the IGBT power switch. State transition 219 is triggered by voltage $V_{CE}$ across the IGBT power switch having fallen to this threshold level and returns the control and drive circuitry to reduced gate voltage state 210.

In some implementations, the functionality for triggering active clamping of the IGBT control and drive circuitry will be active in both switch ON-state 205 and active clamping state 215. Thus, the same functionality that is already present in the IGBT control and drive circuitry can be used in both states 205, 215. In some implementations, the gate-to-emitter voltage $V_{GE}$ in active clamping state 215 is identical to switch ON-state 205. However, this is not necessarily the case and the magnitude of gate-to-emitter voltage $V_{GE}$ with which the IGBT control and drive circuitry drives the power switch needs not be identical to the gate-to-emitter voltage $V_{GE}$ in switch ON-state 205. For example, in some implementations, the gate-to-emitter voltage $V_{GE}$ in active clamping state 215 can be somewhat lower than the gate-to-emitter voltage $V_{GE}$ in switch ON-state 205. In view of such potential differences, switch ON-state 205 and active clamping state 215 are separately illustrated. Further, please note that active clamping functionality of the IGBT control and drive circuitry will be active in both switch ON-state 205 and active clamping state 215.

Switch OFF-state/fault condition 220 originates a reflexive transition 222 and a state transition 224. Reflexive transition 222 indicates ongoing monitoring for a reset of the fault condition. In the fault condition, the IGBT control and drive circuitry cannot drive IGBT power switch into the ON-state. The reset can be originate, e.g., from a human operator, a delay circuit, or other circuitry that indicates that driving the IGBT power switch into the ON-state is again permitted. State transition 224 is triggered by such an indication and transitions the IGBT control and drive circuitry into Switch OFF-state/no-fault condition 225.

Figure 3:
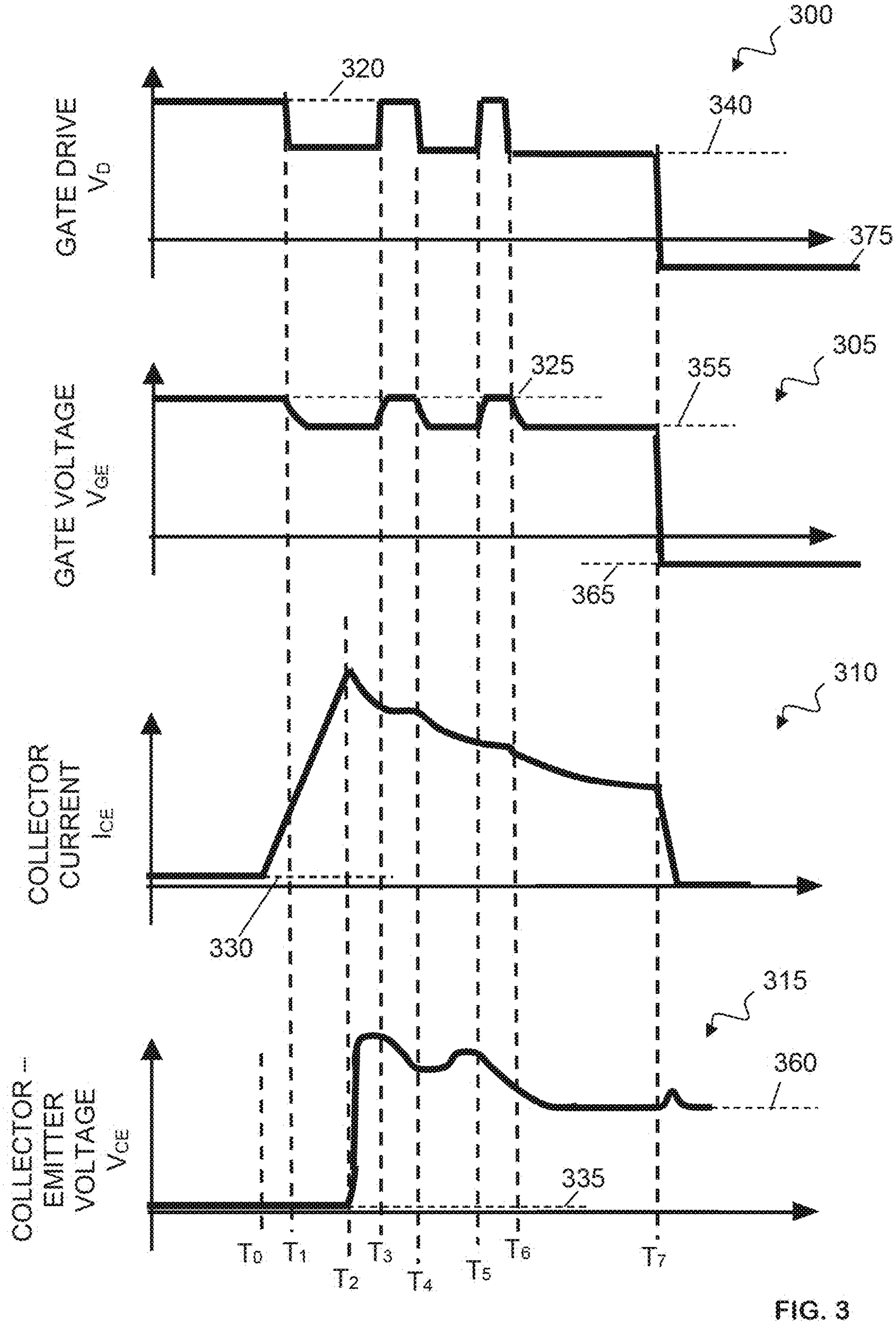
FIG. 3 is a schematic representation of various waveforms during a response to detection of a short circuit during driving of an IGBT power switch.

FIG. 3 is a schematic representation of various waveforms 300, 305, 310, 315 during a response to detection of a short circuit during driving of an IGBT power switch. In particular, waveform 300 represents reference voltage $V_D$ as a function of time, waveform 305 represents the gate-to-emitter voltage $V_{GE}$ as a function of time, waveform 310 represents the collector current $I_C$ as a function of time, and waveform 315 represents the collector-to-emitter voltage $V_{CE}$ as a function of time. The scales are similar to the scales in FIG. 1.

At the beginning of the illustrated time spans, the IGBT is in conduction. The reference voltage $V_D$ represented by waveform 300 and gate-to-emitter voltage $V_{GE}$ represented by waveform 305 are both essentially at their respective highest level 320, 325. Also, the collector current $I_C$ represented by waveform 310 is at a level 330 and collector-to-emitter voltage $V_{CE}$ is at a level 335. In general, levels 320, 325 are selected to make the voltage drop across the IGBT relatively small and reduce conduction losses.

At time $T_0$, a short circuit condition occurs outside the power switch. The collector current represented by waveform 310 starts to increase rapidly. Overcurrent protection functionality in the IGBT controller is triggered in response to detection of the short circuit condition. As before, after the short circuit condition is detected, the overcurrent protection functionality in the IGBT controller starts a process for turning off the IGBT at time $T_1$. The duration of the delay (i.e., the time between $T_0$ and $T_1$) is the time required to initiate short-circuit protection. Once again, the IGBT control and drive circuitry does not initially drive the IGBT with a voltage that would switch the IGBT into an OFF-state. Rather, the IGBT control and drive circuitry initially drives the IGBT with a reference voltage $V_D$ level 340 that reduces the charge carrier concentration compared to when the IGBT is driven with a reference voltage $V_D$ level 320. In general, even this lower charge carrier concentration can suffice to maintain the IGBT in the ON-state. Like in FIG. 1, for common IGBTs, voltage level 320 can be, e.g., between 20 and 30 Volts and voltage level 340 can be, e.g., between 7 and 17 Volts.

Figure 4:
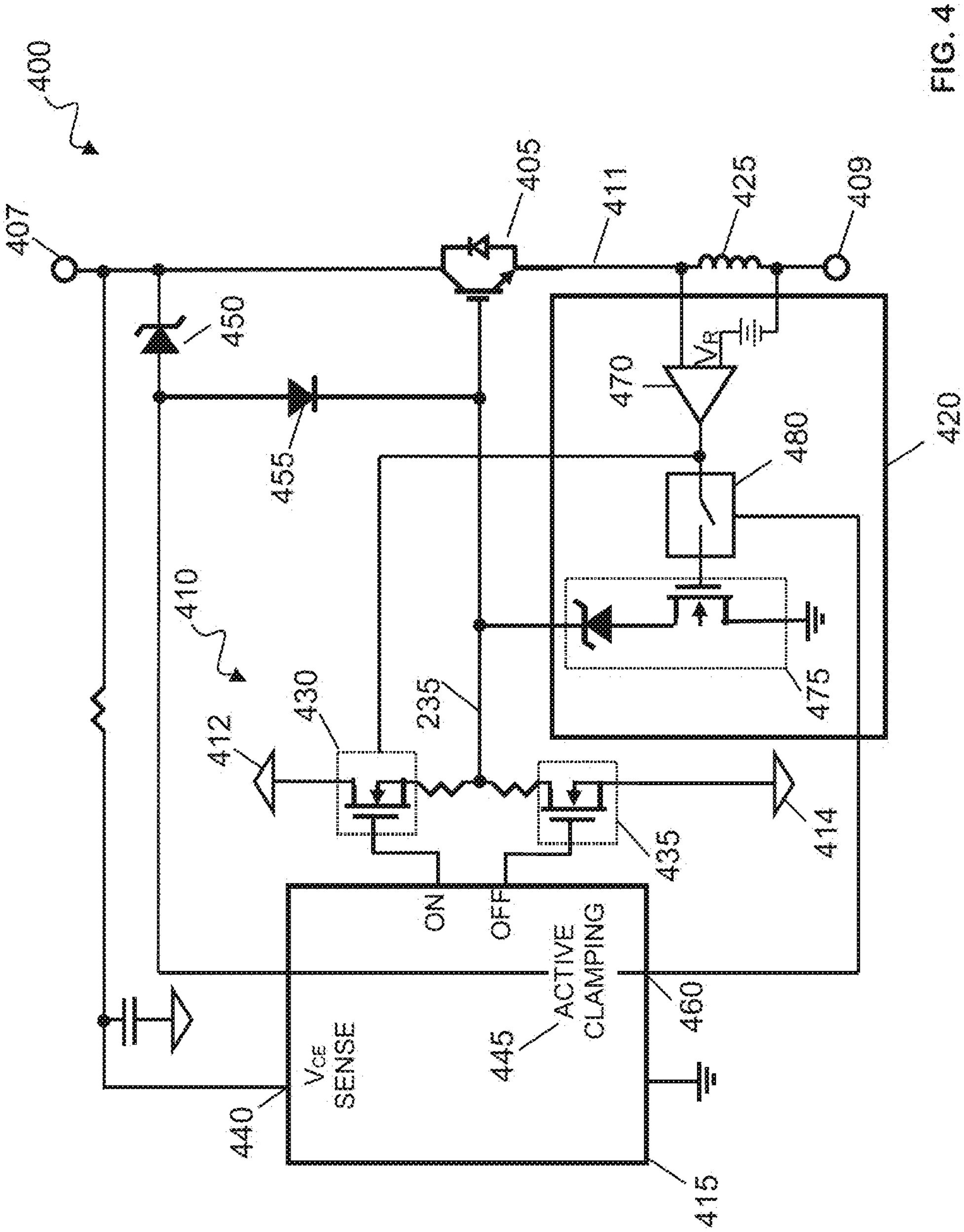
FIG. 4 is a schematic representation of circuitry that participates in responding to detection of a short circuit during driving of an IGBT power switch.

The IGBT controller and associated circuitry detects the high level of the collector-to-emitter voltage $V_{CE}$ and responds by increasing the gate-to-emitter voltage $V_{GE}$ represented in waveform 305 at time $T_3$. The increase can be implemented using active clamping functionality. For example, as illustrated in FIG. 4 below, any clamping of the gate can be removed and active clamping functionality can increase the voltage applied to the gate. In the illustrated implementation, the gate-to-emitter voltage $V_{GE}$ is increased at time $T_3$ to the same level 320 as in the ON-state in an approximately step-like transition on the illustrated time scale. This is not necessarily the case. For example, in other implementations, the gate-to-emitter voltage $V_{GE}$ can be increased to a level that is between levels 340 and 320. As another example, in some implementations, the increase in the gate-to-emitter voltage $V_{GE}$ can be more gradual, e.g., with a rate of change that is tailored to or regulated based on the rate of change of the collector-to-emitter voltage $V_{CE}$.

Regardless of the details of the increase in the gate-to-emitter voltage $V_{GE}$, additional charge carriers are drawn into the channel of the IGBT power switch and the rate of decrease in the collector current $I_C$ is reduced. In other words, the increase in collector-to-emitter voltage $V_{CE}$ beyond the level 360 of the voltage that was switched is proportional to the stray inductance of the commutation loop and the rate of change in the current through the IGBT power switch. By drawing additional charge carriers into the channel of the IGBT power switch, both the rate of decrease in the collector current $I_C$ and the collector-to-emitter voltage $V_{CE}$ are reduced. However, the IGBT is not in danger of exiting the safe operating area due to the lower and therefore safe level of the collector-to-emitter voltage $V_{CE}$.

At time $T_4$, the collector-to-emitter voltage $V_{CE}$ represented in waveform 315 will have fallen to an extent that it is less likely that the IGBT power switch will be harmed. The IGBT controller and associated circuitry can monitor the collector-to-emitter voltage $V_{CE}$ and—in response to the fall—can again reduce the gate voltage to a voltage level that reduces the charge carrier concentration in the channel and results in a higher forward voltage drop of the channel than when driven with gate-to-emitter voltage $V_{GE}$ level 325.

The IGBT controller and associated circuitry can detect the level of the collector-to-emitter voltage $V_{CE}$ in several different ways. For example, in some implementations, transient voltage suppressors in active clamping circuitry that is coupled to the collector of the IGBT power switch can passively monitor the collector-to-emitter voltage $V_{CE}$. In the event that the collector-to-emitter voltage $V_{CE}$ rises above a breakdown voltage of a transient voltage suppressor diode associated with the IGBT power switch, the active clamping circuitry can increase gate bias using current drawn from the collector and additional charge carriers can be drawn into the channel of the IGBT power switch. As the collector-to-emitter voltage $V_{CE}$ falls below the threshold, the feedback from the collector of the IGBT power switch stops and the gate voltage reduced. Other approaches are possible.

In the illustrated implementations, the IGBT control and drive circuitry drives the IGBT with the same reference voltage $V_D$ level 340 as during the time span between $T_1$ and $T_3$. However, this is not necessarily the case and other reference voltage $V_D$ levels that are below or above level 320 can be used. The gate-to-emitter voltage $V_{GE}$ represented in waveform 305 decreases more slowly than the reference voltage $V_D$ represented in waveform 300.

In some instances, desaturation of the IGBT power switch will be detected and the collector current $I_C$ will reach a level from which the IGBT can be safely driven into the OFF-state. In some implementation, this is a steady-state desaturation condition. In response, the IGBT control and drive circuitry drives the IGBT with a (generally, negative) gate-to-emitter voltage $V_{GE}$ level 375 that is low enough to switch the IGBT in the OFF-state.

However, in the illustrated implementation, the collector-to-emitter voltage $V_{CE}$ shown in waveform 315 again starts to increase before collector current $I_C$ reaches such a level and the IGBT once again becomes in danger of exiting the safe operating area. The IGBT controller and associated circuitry detects the increase in collector-to-emitter voltage $V_{CE}$ and, at time $T_5$, responds by allowing the reference voltage $V_D$ represented in waveform 300 to be increased. Once again, an approximately step-like transition to level 320 is illustrated but not required. Additional charge carriers are drawn into the channel of the IGBT and the rate of decrease in the collector current $I_C$ is reduced. Further, the collector-to-emitter voltage $V_{CE}$ represented in waveform 315 starts to fall.

At time $T_6$, the collector-to-emitter voltage $V_{CE}$ represented in waveform 315 has again fallen to an extent that it is less likely that the IGBT will exit from the safe operating area. The IGBT control and drive circuitry can monitor the collector-to-emitter voltage $V_{CE}$ and—in response to the fall—can again reduce the gate-to-emitter voltage $V_{GE}$ to a voltage level that reduces the charge carrier concentration in the channel and results in a higher channel forward voltage drop in the channel than when driven with level 325. Gate-to-emitter voltage $V_{GE}$ represented in waveform 305 will also decrease.

As before, the gate-to-emitter voltage $V_{GE}$ is expected to approach level 355. Further, over a longer time (here, the time between $T_6$ and $T_7$), the collector current $I_C$ will reach a level from which the IGBT can be safely driven into the OFF-state. In some instances, this level is a steady state level that is determined by both the applied gate voltage, the level 360 of the voltage that was switched, temperature, and other factors. In any case, desaturation protection circuitry can detect desaturation of the IGBT power switch and, in response at $T_7$, the IGBT control and drive circuitry will drive the IGBT with a (generally, negative) gate-to-emitter voltage $V_{GE}$ level 365 that suffices to switch the IGBT in the OFF-state.

Once again, the gate-to-emitter voltage $V_{GE}$ represented in waveform 305 decreases more slowly than the reference voltage $V_D$ in waveform 300. The collector current $I_C$ drops relatively rapidly during this transition and will fall to approximately zero as the IGBT reaches the OFF-state. The collector-to-emitter voltage $V_{CE}$ may transiently overshoot a level 360 of the voltage that was switched due to the rapid change in the collector current $I_C$. Ultimately, the collector-to-emitter voltage $V_{CE}$ will stabilize at the level 360 of the voltage that was switched.

FIG. 4 is a schematic representation of circuitry 400 that participates in responding to detection of a short circuit during driving of an IGBT power switch. Circuitry 400 includes the IGBT power switch 405 itself, as well as driver circuitry 410, an IGBT controller 415, and short circuit detection and protection circuitry 420.

IGBT power switch 405 is illustrated as an n-channel device and includes a collector coupled to a node 407, an auxiliary emitter coupled to an internal parasitic inductance 425 (i.e., the bond wires between the auxiliary emitter and main emitter), and the main emitter node 409. Typically, IGBT power switch 405 will be able to withstand relatively high voltages, e.g., voltages between 600 and 6500 Volts. IGBT power switch 405 can be part of any of a number of different devices in different operational contexts. For example, IGBT power switch 405 will typically be part of a half-bridge topology, e.g., as part of a phase leg in an inverter, part of a motor drive, or part of a switched mode power converter.

Driver circuitry 410 is coupled to the gate of IGBT power switch 405. In the illustrated implementation, driver circuitry includes a pull-up transistor 430, a pull-down transistor 435, and associated resistances that act as a gate resistance for IGBT power switch 405. Other implementations are possible, including, e.g., using additional voltage levels, transistors, and a single gate resistance. For example, in some implementations, two or more pull-up transistors can be provided to bias the gate of IGBT power switch 405 to different levels (e.g., levels 320, 340 (FIG. 3)). In response to an ON signal, pull-down transistor 435 is turned off and pull-up transistor 430 is switched into conduction and forms a conductive path between supply voltage 412 and the gate of IGBT power switch 405. In the illustrated implementation, supply voltage 412 has a fixed level relative to auxiliary emitter node 411. The level of supply voltage 412 is selected to make the voltage drop across IGBT power switch 405 relatively small. In the context of FIGS. 1 and 3, supply voltage 412 is at level 115 and 320.

In response to an OFF signal, pull-up transistor 430 is turned off and pull-down transistor 435 is switched into conduction and forms a conductive path between supply voltage 414 and the gate of IGBT power switch 405. In the illustrated implementation, the voltage supplied by supply voltage 414 has a negative level relative to auxiliary emitter node 411. In the context of FIGS. 1 and 3, supply voltage 414 is at level 145, 150 and level 375, 365. As an aside, IGBT controller 415 is configured to ensure that both transistors 430, 435 are not switched into conduction simultaneously.

IGBT controller 415 is a controller that is configured to control the switching of IGBT power switch 405. IGBT controller 415 includes a $V_{CE}$ sense terminal 440 and participates in active clamping functionality 445. $V_{CE}$ sense terminal 440 is coupled across IGBT power switch 405 to sense collector-to-emitter voltage $V_{CE}$.

Active clamping functionality 445 is configured to slow the transition of the IGBT power switch 405 into the OFF state in the event of a collector-emitter overvoltage and suppress transient voltages that would arise due to rapid changes in the collector current. In the illustrated implementation, active clamping functionality 445 includes a direct current path for charging the gate of IGBT power switch 405 using the voltage on the collector of IGBT power switch 405, as well as functionality internal to IGBT controller 415. The illustrated implementation of the direct current path includes Zener diode 450 (or a similar device) and diode 455 for charging the gate of IGBT power switch 405 using the voltage on the collector of IGBT power switch 405, as well as functionality internal to IGBT controller 415. For example, in some implementations, active clamping functionality 445 can include circuitry to decrease current flow through pull-down transistor 435 in response to detection of a collector overpotential. By decreasing this current flow, the gate of IGBT power switch 405 can be charged more quickly via Zener diode 450 (or a similar device) and diode 455.

Further, in the illustrated implementation, active clamping functionality 445 includes an output terminal 460 that is coupled to control a switch in short circuit detection and protection circuitry 420. During active clamping, clamp circuitry 475 will be deactivated and the gate voltage will be allowed to increase.

The schematically-illustrated implementation of short circuit detection and protection circuitry 420 includes a comparator 470, clamp circuitry 475, and a switch 480. Comparator 470 is coupled to compare the voltage across inductance 425 with a reference voltage $V_R$ to detect a short circuit condition. The voltage across inductance 425 is indicative of the time rate of change in the collector current $I_C$. In real-world implementations, the detection of a short circuit condition will generally involve other components and functionality. For example, blanking circuitry will be used to exclude high rates of change in the collector current $I_C$ during turn-on.

Also, for didactic purposes, a battery is shown as providing reference voltage $V_R$ relative to reference voltage 409. This is not necessarily the case and, in general, reference voltage $V_R$ will be set by a voltage divider or other voltage source. In some implementations, reference voltage $V_R$ can be settable by a user, e.g., based on the safe operating area or other characteristics of IGBT power switch 405 and/or the operational context of IGBT power switch 405.

Clamp circuitry 475 is configured to reversibly clamp the gate voltage of IGBT power switch 405 to a maximum value. For example, clamp circuitry 475 can clamp the voltage applied to the gate of IGBT power switch 405 at a level 130, 340 (FIGS. 1, 3). Clamp circuitry 475 thus forms a dynamic voltage suppressor and, in the illustrated implementation, includes a Zener diode (or similar device) and transistor switch. In the illustrated implementation, the maximum value of the gate voltage of IGBT power switch 405 will be set by the breakdown voltage of the Zener diode (or similar device) and the voltage drop across the transistor switch. The transistor switch can switch into and out of conduction to reversibly clamp and unclamp the gate voltage.

Switch 480 is switchable by IGBT controller 415 to allow or prevent comparator 470 from clamping the gate voltage of IGBT power switch 405 using clamp circuitry 475.

In operation, IGBT controller 415 can control transistors 430, 435 so that IGBT power switch 405 is in the ON-state. Short circuit detection and protection circuitry 420 can detect a short circuit by comparing the rate of change in the collector current $I_C$ with a threshold reference voltage $V_R$. In the event that a short circuit is detected, comparator 470 can output a signal that:

- switches OFF pull-up transistor 430, and
- biases clamp circuitry 475 to clamp the gate voltage of IGBT power switch 405.

In the context of state diagram 200 (FIG. 2), this corresponds to state transition 209. If clamping continues, the actual gate-to-emitter voltage $V_{GE}$ of IGBT power switch 405 will eventually fall to the clamped level (i.e., below the voltage level supplied by supply voltage 412) and the number of charge carriers present in the channel of IGBT power switch 405 will reduce. In the event that IGBT power switch 405 reaches a desaturation level, it can be safely driven into the OFF-state and IGBT controller 415 can control transistors 430, 435 to transition IGBT power switch 405 into the OFF state. In the context of state diagram 200 (FIG. 2), this corresponds to state transition 213.

In some instances, IGBT controller 415 will detect an overvoltage via the $V_{CE}$ sense terminal 440 notwithstanding the gate voltage being clamped. In these cases, active clamping functionality 445 outputs a signal over terminal 460 that opens switch 480 and prevents comparator 470 from clamping the gate voltage of IGBT power switch 405. Without clamping, the gate of IGBT power switch 405 will rise due to the charge provided by active clamping functionality 445 (e.g., via Zener diode 450 (or similar device) and resistance 455). In the context of state diagram 200 (FIG. 2), this corresponds to state transition 214.

In the event that desaturation is detected and the collector current $I_C$ now falls to a level from which IGBT power switch 405 can be safely driven into the OFF-state, IGBT controller 415 can control transistors 430, 435 to transition IGBT power switch 405 into the OFF state, corresponding to state transition 213. In the event that an overvoltage again arises across IGBT power switch 405, active clamping functionality 445 will resume active clamping, corresponding to state transition 214.

Transitions between clamping the gate voltage of IGBT power switch 405 and increased gate voltages due to active clamping can continue until the collector current $I_C$ falls to levels from which IGBT power switch 405 can be safely driven into the OFF-state, corresponding to state transition 213.

A number of implementations have been described. Nevertheless, it will be understood that various modifications may be made. Accordingly, other implementations are within the scope of the following claims.

Further, the invention can also be achieved by one or more of the following embodiments.

Embodiment 1. A control system for a power switch having a channel, the system comprising: short circuit detection circuitry configured to detect an external short circuit; overvoltage detection circuitry configured to detect an overvoltage across the power switch; and short circuit protection circuitry configured to: in response to detection of an external short circuit by the short circuit detection circuitry while the power switch is in a first ON-state, change the control terminal of the power switch from a first potential level that provides a charge carrier concentration in the channel of the power switch to a second potential level, wherein the second potential level decreases the charge carrier concentration in the channel, and in response to detection of an overvoltage across the power switch by the overvoltage detection circuitry while the control terminal of the power switch is at the second potential level, change the control terminal of the power switch from the second potential level to a third potential level that increases the charge carrier concentration in the channel.

Embodiment 2. The control system of embodiment 1, wherein the short circuit detection circuitry is configured to detect the external short circuit condition based on a time rate of change of current in the power switch.

Embodiment 3. The control system of embodiment 1 or 2, wherein the short circuit protection circuitry comprises active clamping circuitry configured to slow transition of the power switch into an OFF-state in response to the detection of an overvoltage.

Embodiment 4. The control system of embodiment 3, wherein the active clamping circuitry is configured to charge a control terminal of the power switch using a voltage switched by the power switch.

Embodiment 5. The control system of any one of embodiments 1 to 4, wherein the short circuit protection circuitry comprises a switchable clamp configured to clamp the control terminal of the power switch at the second potential level.

Embodiment 6. The control system of embodiment 5, wherein the short circuit protection circuitry comprises active clamping circuitry configured to slow transition of the power switch, wherein the short circuit protection circuitry is configured to end or reduce the clamping of the control terminal of the power switch to slow the transition.

Embodiment 7. The control system of any one of embodiments 1 to 6, wherein the short circuit protection circuitry is configured to clamp the control terminal of the power switch in response to the short circuit detection circuitry detecting the external short circuit.

Embodiment 8. The control system of embodiment 7, wherein the short circuit protection circuitry comprises active clamping circuitry configured to slow transition of the power switch, wherein the short circuit protection circuitry is configured to end or reduce the clamping of the control terminal of the power switch to slow the transition.

Embodiment 9. The control system of any one of embodiments 1 to 8, wherein the third potential level is the first potential level.

Embodiment 10. The control system of any one of embodiments 1 to 9, wherein: the power switch is an IGBT power switch; the first potential level voltage level is between 20 and 30 Volts; and the second potential level voltage level is between 7 and 17 Volts.

Embodiment 11. The control system of any one of embodiments 1 to 10, wherein the power switch remains in a second ON-state when the control terminal is at the second potential level.

Embodiment 12. The control system of any one of embodiments 1 to 11, wherein the short circuit protection circuitry is further configured to, in response to detection of desaturation of the power switch, change the control terminal of the power switch circuit to a fourth potential level that decreases the charge carrier concentration in the channel and switches the power switch into an OFF-state.

Embodiment 13. A method of controlling a power switch, the method comprising: biasing the power switch that is in the ON-state to provide a first carrier concentration in the channel of the power switch; during the biasing of the power switch to provide the first carrier concentration, detecting an external short circuit that increases current flow through the power switch; in response to the detection of the external short circuit, biasing the power switch to provide a second carrier concentration in the channel of the power switch, wherein the second carrier concentration is less than the first carrier concentration; during the biasing of the power switch to provide the second carrier concentration, detecting an overvoltage across the power switch; in response to the detection of the overvoltage, biasing the power switch to provide a third carrier concentration in the channel of the power switch, wherein the third carrier concentration is greater than the second carrier concentration.

Embodiment 14. The method of embodiment 13, further comprising: during the biasing of the power switch to provide the third carrier concentration, detecting that voltage across the power switch has fallen to a threshold level; and biasing the power switch to provide a fourth carrier concentration in the channel of the power switch, wherein the fourth carrier concentration is less than the third carrier concentration.

Embodiment 15. The method of embodiment 14, further comprising: repeatedly biasing the power switch to first provide a higher carrier concentration in response to the detection of an overvoltage and then provide a lower carrier concentration in response to detect that voltage across the power switch has fallen to the threshold level.

Embodiment 16. The method of any one of embodiments 13 to 15, wherein a potential level to provide the first carrier concentration and the potential level switch to provide the third carrier concentration is the same and a potential level to provide the second carrier concentration and the fourth carrier concentration is the same.

Embodiment 17. The method of any one of embodiments 13 to 16, wherein detecting the external short circuit comprises detecting that a time rate of change of the current flow through the power switch exceeds a threshold.

Embodiment 18. The method of any one of embodiments 13 to 17 wherein: biasing the power switch to provide the second carrier concentration comprises clamping a control terminal of the power switch to a voltage level; and biasing the power switch to provide the third carrier concentration comprises unclamping the control terminal of the power switch from the voltage level.

Embodiment 19. The method of any one of embodiments 13 to 18, wherein biasing the power switch to provide the third carrier concentration comprises biasing a control terminal of the power switch using a voltage switched by the power switch.

Embodiment 20. The method of any one of embodiments 13 to 19, wherein: the power switch is an IGBT power switch; the first carrier concentration is provided by a gate-to-emitter voltage of between 20 and 30 Volts; and the second carrier concentration is provided by a gate-to-emitter voltage of between 7 and 17 Volts.

Embodiment 21. The method of any one of embodiments 13 to 20, wherein the switch remains in the ON-state at the second carrier concentration and the third carrier concentration.

Embodiment 22. The method of any one of embodiments 13 to 21, further comprising: detecting desaturation of the power switch; and in response to the detection of the desaturation of the power switch, biasing the power switch into an OFF-state.

What is claimed is:

1. A control system for a power switch having a channel, the system comprising:

short circuit detection circuitry configured to detect an external short circuit;

overvoltage detection circuitry configured to detect an overvoltage across the power switch; and short circuit protection circuitry configured to:

in response to detection of an external short circuit by the short circuit detection circuitry while the power switch is in a first ON-state, change the control terminal of the power switch from a first potential level that provides a charge carrier concentration in the channel of the power switch to a second potential level, wherein the second potential level decreases the charge carrier concentration in the channel and the power switch remains in a second ON-state when the control terminal is at the second potential level, and in response to detection of an overvoltage across the power switch by the overvoltage detection circuitry while the control terminal of the power switch is at the second potential level, change the control terminal of the power switch from the second potential level to a third potential level that increases the charge carrier concentration in the channel.

2. The control system of claim 1, wherein the short circuit detection circuitry is configured to detect the external short circuit condition based on a time rate of change of current in the power switch.

3. The control system of claim 1, wherein the short circuit protection circuitry comprises active clamping circuitry configured to slow transition of the power switch into an OFF-state in response to the detection of an overvoltage.

4. The control system of claim 3, wherein the active clamping circuitry is configured to charge a control terminal of the power switch using a voltage switched by the power switch.

5. The control system of claim 1, wherein the short circuit protection circuitry comprises a switchable clamp configured to clamp the control terminal of the power switch at the second potential level.

6. The control system of claim 5, wherein the short circuit protection circuitry comprises active clamping circuitry configured to slow transition of the power switch, wherein the short circuit protection circuitry is configured to end or reduce the clamping of the control terminal of the power switch to slow the transition.

7. The control system of claim 1, wherein the short circuit protection circuitry is configured to clamp the control terminal of the power switch in response to the short circuit detection circuitry detecting the external short circuit.

8. The control system of claim 7, wherein the short circuit protection circuitry comprises active clamping circuitry configured to slow transition of the power switch, wherein the short circuit protection circuitry is configured to end or reduce the clamping of the control terminal of the power switch to slow the transition.

9. The control system of claim 1, wherein the third potential level is the first potential level.

10. The control system of claim 1, wherein:

the power switch is an IGBT power switch;

the first potential level voltage level is between 20 and 30 Volts; and the second potential level voltage level is between 7 and 17 Volts.

11. The control system of claim 1, wherein the short circuit protection circuitry is further configured to, in response to detection of desaturation of the power switch, change the control terminal of the power switch circuit to a fourth potential level that decreases the charge carrier concentration in the channel and switches the power switch into an OFF-state.

12. A method of controlling a power switch the method comprising:

biasing the power switch that is in the ON-state to provide a first carrier concentration in the channel of the power switch;

during the biasing of the power switch to provide the first carrier concentration, detecting an external short circuit that increases current flow through the power switch;

in response to the detection of the external short circuit, biasing the power switch to provide a second carrier concentration in the channel of the power switch, wherein the second carrier concentration is less than the first carrier concentration;

during the biasing of the power switch to provide the second carrier concentration, detecting an overvoltage across the power switch;

in response to the detection of the overvoltage, biasing the power switch to provide a third carrier concentration in the channel of the power switch, wherein the third carrier concentration is greater than the second carrier concentration;

during the biasing of the power switch to provide the third carrier concentration, detecting that voltage across the power switch has fallen to a threshold level; and biasing the power switch to provide a fourth carrier concentration in the channel of the power switch, wherein the fourth carrier concentration is less than the third carrier concentration.

13. The method of claim 12, further comprising:

repeatedly biasing the power switch to first provide a higher carrier concentration in response to the detection of an overvoltage and then provide a lower carrier concentration in response to detect that voltage across the power switch has fallen to the threshold level.

14. The method of claim 12, wherein:

a potential level to provide the first carrier concentration and to provide the third carrier concentration is the same; and a potential level to provide the second carrier concentration and to provide the fourth carrier concentration is the same.

15. The method of claim 12, wherein detecting the external short circuit comprises detecting that a time rate of change of the current flow through the power switch exceeds a threshold.

16. The method of claim 12, wherein:

biasing the power switch to provide the second carrier concentration comprises clamping a control terminal of the power switch to a voltage level; and biasing the power switch to provide the third carrier concentration comprises unclamping the control terminal of the power switch from the voltage level.

17. The method of claim 12, wherein biasing the power switch to provide the third carrier concentration comprises biasing a control terminal of the power switch using a voltage switched by the power switch.

18. The method of claim 12, wherein:

the power switch is an IGBT power switch;

the first carrier concentration is provided by a gate-to-emitter voltage of between 20 and 30 Volts; and the second carrier concentration is provided by a gate-to-emitter voltage of between 7 and 17 Volts.

19. A method of controlling a power switch, the method comprising:

biasing the power switch that is in the ON-state to provide a first carrier concentration in the channel of the power switch;

during the biasing of the power switch to provide the first carrier concentration, detecting an external short circuit that increases current flow through the power switch;

in response to the detection of the external short circuit, biasing the power switch to provide a second carrier concentration in the channel of the power switch, wherein the second carrier concentration is less than the first carrier concentration;

during the biasing of the power switch to provide the second carrier concentration, detecting an overvoltage across the power switch; and in response to the detection of the overvoltage, biasing the power switch to provide a third carrier concentration in the channel of the power switch, wherein the third carrier concentration is greater than the second carrier concentration and the switch remains in the ON-state at the second carrier concentration and the third carrier concentration.

20. The method of claim 19, further comprising:

detecting desaturation of the power switch; and in response to the detection of the desaturation of the power switch, biasing the power switch into an OFF-state.

21. The method of claim 19 wherein detecting the external short circuit comprises detecting that a time rate of change of the current flow through the power switch exceeds a threshold.

22. The method of claim 19, wherein:

biasing the power switch to provide the second carrier concentration comprises clamping a control terminal of the power switch to a voltage level; and biasing the power switch to provide the third carrier concentration comprises unclamping the control terminal of the power switch from the voltage level.

23. The method of claim 19, wherein biasing the power switch to provide the third carrier concentration comprises biasing a control terminal of the power switch using a voltage switched by the power switch.

* * * * *